United States Patent
Gurevich et al.

(10) Patent No.: US 9,141,833 B2
(45) Date of Patent: Sep. 22, 2015

(54) COMPACT AIMING LIGHT ASSEMBLY AND IMAGING MODULE FOR, AND METHOD OF, GENERATING AN AIMING LIGHT SPOT WITH INCREASED BRIGHTNESS AND UNIFORMITY FROM A LIGHT-EMITTING DIODE OVER AN EXTENDED WORKING DISTANCE RANGE IN AN IMAGING READER

(71) Applicant: SYMBOL TECHNOLOGIES, INC., Schaumburg, IL (US)

(72) Inventors: Vladimir Gurevich, Douglaston, NY (US); Caihua (Lucy) Chen, Albany, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 79 days.

(21) Appl. No.: 13/944,128

(22) Filed: Jul. 17, 2013

(65) Prior Publication Data

US 2015/0021399 A1 Jan. 22, 2015

(51) Int. Cl.
*G06K 19/00* (2006.01)
*G06K 7/015* (2006.01)
*G06K 7/10* (2006.01)

(52) U.S. Cl.
CPC ............ *G06K 7/015* (2013.01); *G06K 7/10732* (2013.01)

(58) Field of Classification Search
USPC .................................. 235/435, 439, 454, 462
See application file for complete search history.

(56) References Cited

U.S. PATENT DOCUMENTS

| | | | |
|---|---|---|---|
| 7,182,260 B2 | 2/2007 | Gurevich et al. | |
| 7,377,437 B2 | 5/2008 | Kricorissian et al. | |
| 8,342,410 B2 | 1/2013 | Chen et al. | |
| 2003/0019934 A1* | 1/2003 | Hunter et al. | 235/462.2 |
| 2008/0223934 A1 | 9/2008 | Havens et al. | |
| 2009/0057413 A1* | 3/2009 | Vinogradov et al. | 235/462.35 |
| 2010/0219248 A1 | 9/2010 | Barkan et al. | |
| 2011/0290885 A1 | 12/2011 | Chen et al. | |

FOREIGN PATENT DOCUMENTS

| | | |
|---|---|---|
| WO | 2011008460 A1 | 5/2012 |
| WO | 2013026180 A1 | 2/2013 |

OTHER PUBLICATIONS

International Search Report and Written Opinion mailed Oct. 14, 2014 in counterpart PCT Application No. PCT/US2014/46314.

\* cited by examiner

*Primary Examiner* — Matthew Mikels
(74) *Attorney, Agent, or Firm* — Nong-Qiang Fan

(57) ABSTRACT

An aiming light assembly generates an aiming light spot with increased brightness and uniformity over a range of working distances in which targets are electro-optically read by image capture. The assembly includes a light emitting diode (LED) for emitting an aiming light beam, a field stop through which the aiming light beam passes, an aiming lens for optically modifying the aiming light beam passing through the field stop to form the aiming light spot over the range of working distances, and a field lens located in the vicinity of the field stop and operative for imaging the LED downstream of the field stop and in the vicinity of a lens aperture of the aiming lens.

20 Claims, 9 Drawing Sheets

COMPACT AIMING LIGHT ASSEMBLY AND IMAGING MODULE FOR, AND METHOD OF, GENERATING AN AIMING LIGHT SPOT WITH INCREASED BRIGHTNESS AND UNIFORMITY FROM A LIGHT-EMITTING DIODE OVER AN EXTENDED WORKING DISTANCE RANGE IN AN IMAGING READER

FIELD OF THE DISCLOSURE

The present disclosure relates generally to an electro-optical reader for reading targets by image capture over a range of working distances and, more particularly, to a compact and efficient, aiming light assembly and an imaging module for, and a method of, generating an aiming light spot with increased brightness and uniformity from a light emitting diode over the working distance range.

BACKGROUND

Solid-state imaging systems or imaging readers have been used, in both handheld and/or hands-free modes of operation, to electro-optically read targets, such as one- and two-dimensional bar code symbols, each bearing elements, e.g., bars and spaces, of different widths and reflectivities, to be decoded, as well as non-symbol targets or forms, such as documents, labels, receipts, signatures, drivers' licenses, employee badges, and payment/loyalty cards, each bearing alphanumeric characters and graphics, to be imaged. A known exemplary imaging reader includes a housing either held by a user and/or supported on a support surface, a window supported by the housing and aimed at the target, and a scan engine or imaging module supported by the housing and having a solid-state imager (or image sensor) with a sensor array of photocells or light sensors (also known as pixels), and an imaging lens assembly for capturing return light scattered and/or reflected from the target being imaged through the window over an imaging field of view, and for projecting the return light onto the image sensor to initiate capture of an image of the target over a range of working distances in which the target can be read. Such an image sensor may include a one- or two-dimensional charge coupled device (CCD) or a complementary metal oxide semiconductor (CMOS) device and associated circuits for producing and processing electrical signals corresponding to a one- or two-dimensional array of pixel data over the field of view. These electrical signals are decoded and/or processed by a programmed microprocessor or controller into information related to the target being read, e.g., decoded data indicative of a symbol target, or into a picture of a non-symbol target.

In order to increase the amount of the return light captured by the sensor array, especially in dimly lit environments and/or at far range reading, the imaging module generally also includes an illuminating light assembly for illuminating the target with illumination light for reflection and scattering therefrom. Since the operator of the imaging reader cannot see exactly whether a target is located entirely within the illuminated field of view of the sensor array, or know whether the target is optimally centrally located within the illuminated field of view, the imaging module also typically includes an aiming light assembly for projecting a visible aiming light pattern, for example, a generally circular aiming spot, or an aiming cross-hairs, for placement at or near the center of the target, or an aiming line, or a series of generally circular aiming spots linearly spaced apart, for placement lengthwise along the target, to assist the user in visually locating the target within the imaging field of view and, thus, advise the user in which direction the reader is to be moved in order to accurately position the aiming light pattern on the target prior to reading. The aiming light assembly includes at least one aiming light source, such as a laser or a light emitting diode (LED), an aiming lens, a field stop, and, sometimes, a pattern shaping optical element, such as a diffractive optical element (DOE), or a refractive optical element (ROE).

As advantageous as such known aiming light assemblies have been, they have proven to be less than satisfactory in certain situations. For example, many compact aiming light assemblies often generate a generally circular aiming spot to mark the center of the imaging field of view. A very compact and power efficient design to do so typically consists of a laser for directing a laser beam through a collimating lens. However, some users, particularly working in the healthcare and retail fields, do not wish to emit laser beams from their imaging readers, primarily out of unwarranted safety concerns for patients and customers, and instead, prefer to use the non-laser light beam emitted from an LED to form the aiming light spot.

However, there are problems with using an LED as the aiming light source. The LED emits its aiming light beam with a large divergence angle. Also, the LED has irregularities over its LED chip surface. These irregularities are caused by the presence of contacts, wires, etc. on the chip surface, and are visible as optical artifacts in the aiming light spot, thereby making the aiming light spot irregular in appearance. The large divergence angle and these optical artifacts make it difficult to design a compact, aiming light assembly capable of optically forming a small, uniform, bright aiming light spot over an extended range of working distances without losing much of the optical output power of the LED.

Thus, as shown in the ray diagram of FIG. 7A, the prior art has proposed creating an aiming spot by locating an LED 1 (extending between points A1 and A2) at a distance X behind a field stop 2 (extending between points B1 and B2), and then imaging the field stop 2, with the help of an aiming lens 3 (extending between points C1, C2, C3 and C4), to a certain distance D2 relative to the aiming lens 3 within the working distance range of the imaging reader. Points B1' and B2' are images of the points B1 and B2 of the field stop 2 via points C1 and C4 on the aiming lens 3. Points A1' and A2' are images of the points A1 and A2 of the LED 1 via points C2 and C3 on the aiming lens 3, and are located at a certain distance D1 relative to the aiming lens 3 within the working distance range of the imaging reader. In FIG. 7A, the LED 1, the field stop 2, and the aiming lens 3 are all symmetrically located on an optical axis 4 of the aiming lens 3. The aiming lens 3 has a lens aperture 5 through which the aiming light passes.

The distance X is typically set to be relatively large in order to, among other things, achieve uniformity of the aiming spot and, as explained below with reference to FIG. 7B, to tolerate any offset or misalignment between the LED 1 and the field stop 2. For example, the aforementioned optical artifacts are visible in the aiming spot at the distance D1 and, in order to prevent such artifacts from interfering with efficient aiming in the working distance range, the distance D1 should be decreased, which, in turn, dictates that the distance X should be increased. As another example, some LEDs have integrated dome lenses to reduce the divergence of the emitted aiming light beam, in which case, the apparent position of the LED 1 moves to the left in FIG. 7A and, in other words, the distance X effectively increases. However, an increased distance X results in high optical losses and low optical power for the aiming light spot. A dim aiming light spot is not readily visible, especially in the far working distance range, thereby degrading and compromising the entire aiming process. Also, an increased distance X increases the overall size of the aiming light assembly and the imaging module, thereby making it difficult to accommodate miniature, compact imaging readers.

As previously mentioned, if there is an offset between the LED 1 and the field stop 2, as shown in the prior art ray diagram of FIG. 7B in which the LED 1 (having point A3 between points A1 and A2) is asymmetrically located relative to the optical axis 4, then the aiming light spot becomes non-uniform in brightness due to vignetting of the aiming light beam on the aiming lens 3. Using the same reference characters as in FIG. 7A, point B2' of the aiming light spot is an image of the point B2 of the field stop 2. Point B2' collects light only from the fractional portion A2-A3 of the LED 1, because the light ray (shown in broken lines between points A1 and B2) misses the aiming lens 3. At the same time, point B1' of the aiming light spot collects light from the entire LED 1, thereby making point B1' much brighter than point B2'. To make the aiming light spot uniform in brightness, the aiming lens 3 would need to be enlarged, thereby rendering the aiming light assembly less compact. Alternatively, the distance X would need to be enlarged, which, as explained above, would further cause additional power losses.

Accordingly, there is a need to increase the brightness and the uniformity of the aiming light spot generated by an LED-based aiming light assembly in an imaging reader, without increasing the overall size of the aiming light assembly and of the imaging module, and with improved tolerance to offsets or misalignment between components of the aiming light assembly, over an extended range of working distances.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
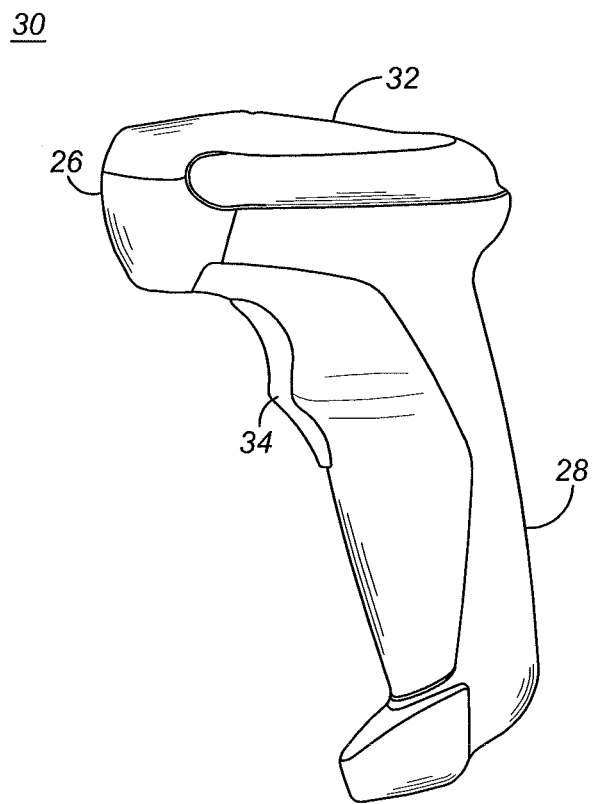
FIG. 1 is a side elevational view of a portable handheld imaging reader for electro-optically reading targets to be read by image capture that can use and benefit from a compact and efficient, aiming light assembly and an imaging module for, and a method of, generating an aiming light spot with increased brightness and uniformity from a light emitting diode in accordance with this invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

One aspect of this disclosure relates to an aiming light assembly for generating at least one aiming light spot with increased brightness and uniformity over a range of working distances in which targets are read by image capture. The aiming light assembly includes a light emitting diode (LED) for emitting an aiming light beam, and a field stop through which the aiming light beam passes. The field stop is in close confronting relationship with the LED. The aiming light assembly further includes an aiming lens having a lens aperture and an optical axis. The aiming lens is spaced along the optical axis away from the field stop and is operative for optically modifying the aiming light beam passing through the field stop to form the at least one aiming light spot over the range of working distances. A field lens is located in the vicinity of the field stop and is spaced along the optical axis away from the LED. The field lens is operative for imaging the LED downstream of the field stop and in the vicinity of the lens aperture of the aiming lens.

In a preferred embodiment, the field lens is located between the LED and the field stop along the optical axis, and is operative for imaging the LED onto the lens aperture of the aiming lens. The field lens is advantageously configured as a plano-convex lens having a convex surface facing the field stop. The aiming lens is advantageously configured as a concave-convex lens having a concave surface facing the field stop. In the event that the LED is offset from, and misaligned with, the optical axis, the field lens is operative for imaging the entire LED onto the lens aperture of the aiming lens despite the offset.

Another aspect of this disclosure relates to an imaging module in a reader for electro-optically reading targets by image capture over a range of working distances. The imaging module includes a printed circuit board (PCB); an illumination light assembly mounted on the PCB for illuminating a target; an imaging assembly having a solid-state imager with an array of image sensors mounted on the PCB, and an imaging lens for capturing return light over an imaging field of view (FOV) from the illuminated target, and for projecting the captured return light onto the array; and the above-described aiming light assembly mounted on the PCB.

Still another aspect of this disclosure relates to a method of generating at least one aiming light spot with increased brightness and uniformity over a range of working distances in which targets are electro-optically read by image capture. The method is performed by emitting an aiming light beam from a light emitting diode (LED); passing the aiming light beam through a field stop that is in close confronting relationship with the LED; optically modifying the aiming light beam passing through the field stop to form the at least one aiming light spot over the range of working distances by spacing an aiming lens, which has a lens aperture and an optical axis, away from the field stop along the optical axis; and imaging the LED downstream of the field stop and in the vicinity of the lens aperture of the aiming lens by locating a field lens in the vicinity of the field stop and spaced away from the LED along the optical axis.

Turning now to the drawings, reference numeral 30 in FIG. 1 generally identifies an ergonomic imaging reader configured as a gun-shaped housing having an upper barrel or body 32 and a lower handle 28 tilted rearwardly away from the body 32 at an angle of inclination, for example, fifteen degrees, relative to the vertical. A window 26 is located adjacent the front or nose of the body 32 and is preferably also tilted at an angle of inclination, for example, fifteen degrees, relative to the vertical. The imaging reader 30 is held in an operator's hand and used in a handheld mode in which a trigger 34 is manually depressed to initiate imaging of targets, especially one- or two-dimensional symbols, to be read in a range of working distances relative to the window 26. Housings of other configurations can also be employed.

Figure 2:
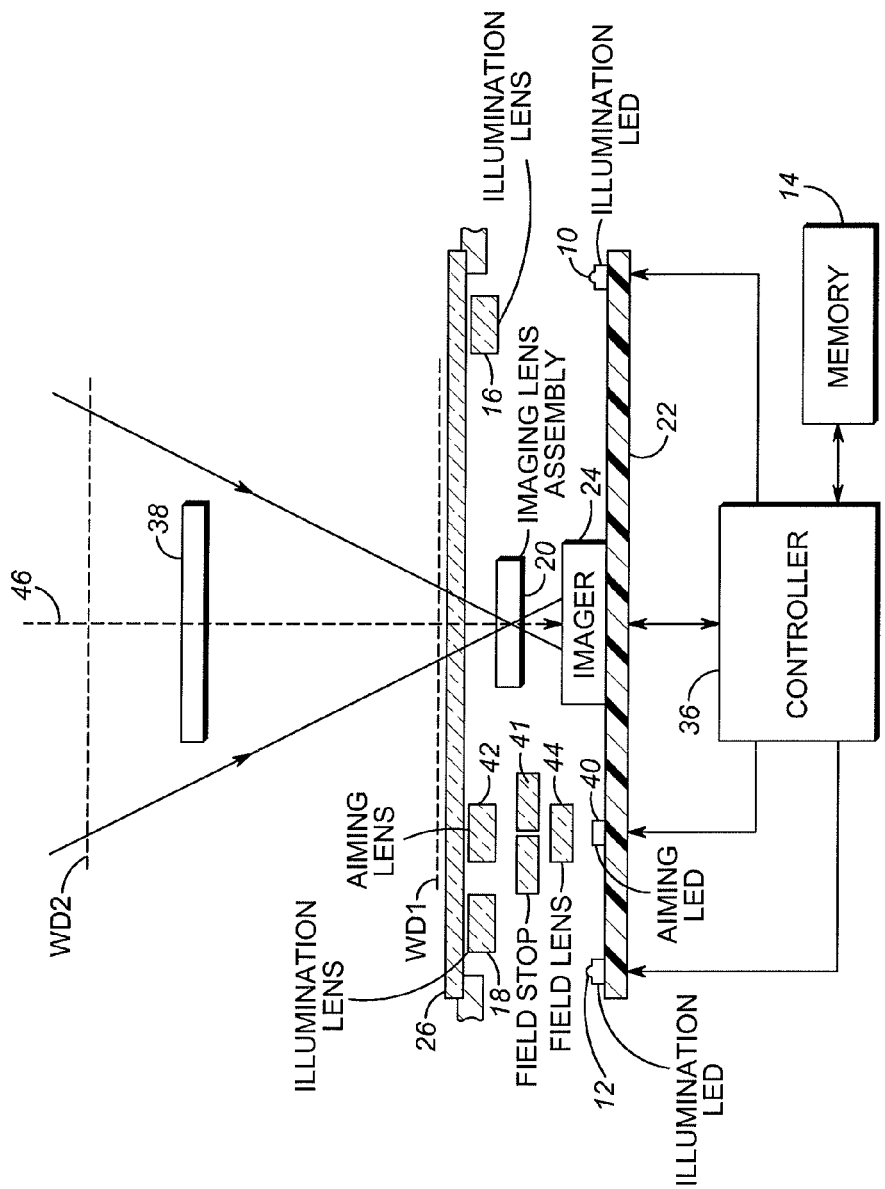
FIG. 2 is a schematic diagram of various components of the reader of FIG. 1.
Figure 3:
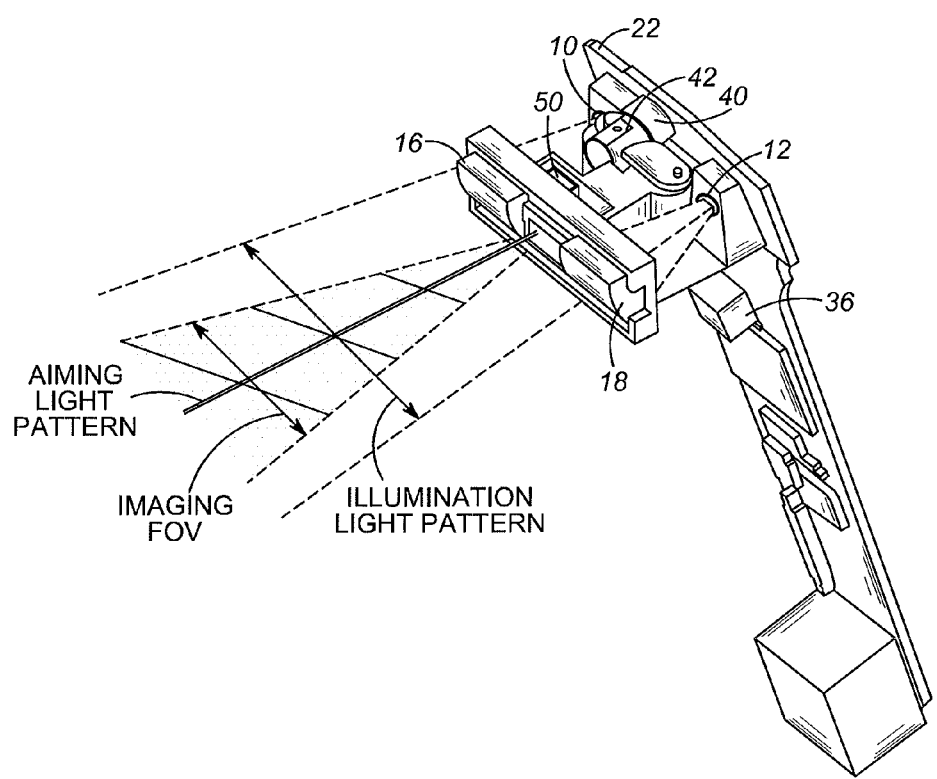
FIG. 3 is a perspective view of various components of the reader of FIG. 1.

As schematically shown in FIG. 2, an imaging assembly includes an imager 24 mounted on a printed circuit board (PCB) 22 in the reader 30. The PCB 22 is mounted within the tilted handle 28 and is also tilted, as shown in FIG. 3, at an angle of inclination, for example, fifteen degrees, relative to the vertical. The imager 24 is a solid-state device, for example, a CCD or a CMOS imager having a one- or two-dimensional array of addressable image sensors or pixels arranged in a single, linear row, or in mutually orthogonal rows and columns, and operative for detecting return light captured by an imaging lens assembly 20 along an imaging axis 46 through the window 26 over an imaging field of view (FOV). The return light is scattered and/or reflected from a target or symbol 38 over the imaging FOV that is generally perpendicular to the imaging axis 46.

The imaging lens assembly 20 is operative for focusing the return light onto the array of image sensors to enable the symbol 38 to be read. The symbol 38 may be located anywhere in a working range of distances between a close-in working distance (WD1) and a far-out working distance (WD2). In a preferred embodiment, WD1 is about one-half inch from the window 26, and WD2 is about thirty inches from the window 26.

An illuminating light assembly is also mounted in the imaging reader and includes an illumination light source, e.g., at least one light emitting diode (LED), and preferably a plurality of LEDs, such as a pair of illumination LEDs 10, 12 mounted on the PCB 22, and a pair of illumination lenses 16, 18 configured to generate a substantially uniform distributed illumination pattern of light on and along the symbol 38 to be read by image capture. At least part of the scattered and/or reflected return light is derived from the illumination pattern of light on and along the symbol 38. The window 26 is tilted to avoid reflections of the illumination light from the LEDs 10, 12 from reaching the imaging lens assembly 20.

Although in some applications, the illuminating light assembly itself can serve as an aiming aid, it is preferred to provide a separate aiming light assembly to increase the range at which aiming light patterns can be seen on symbols and also to help counter the effect of sunlight washing out the aiming light patterns. The separate aiming light assembly is also mounted in the imaging reader, and includes an aiming light source 40, e.g., at least one light emitting diode (LED), also mounted on the PCB 22 and operative for emitting an aiming light beam, a field lens 44, a field stop 41 having a pinhole opening, and an aiming lens 42 for optically modifying and shaping the aiming light beam emitted by the aiming LED 40 and passing through the field lens 44 and the field stop 41 in order to project a generally circular, aiming light spot centrally located on the symbol 38 prior to reading over the range of working distances.

As diagrammatically shown in FIG. 2, the imager 24, the illumination LEDs 10, 12 and the aiming LED 40 are operatively connected to a controller or programmed microprocessor 36 operative for controlling the operation of these components. A memory 14 is connected and accessible to the controller 36. Preferably, the microprocessor 36 is also used for processing the electrical signals from the imager 24 and for processing and decoding the captured target images. The controller 36 and the memory 14 are advantageously mounted on the PCB 22.

In operation, the microprocessor 36 sends command signals to initially energize the aiming LED 40 to project an aiming light spot on the target symbol 38, and then, to energize the illumination LEDs 10, 12 for a short exposure time period, say 500 microseconds or less, and to energize and expose the imager 24 to collect the return light, e.g., illumination light and/or ambient light, from the target symbol 38 only during said exposure time period. A typical array needs about 18-33 milliseconds to acquire the entire target image and operates at a frame rate of about 30-60 frames per second.

Figure 4:
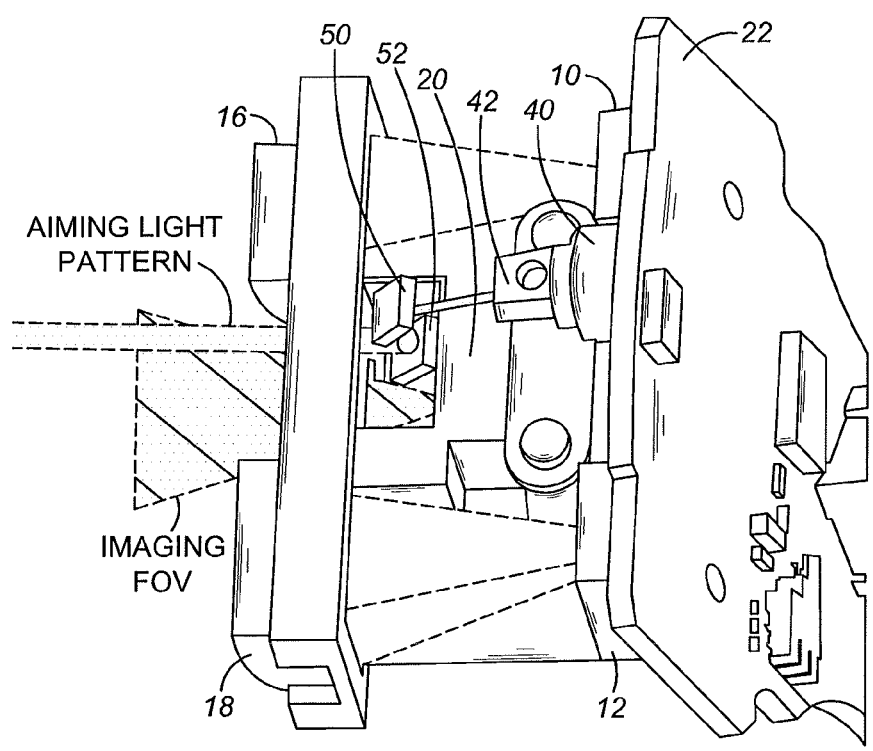
FIG. 4 is an enlarged, overhead, broken-away, perspective view of the components of FIG. 3.
Figure 5:
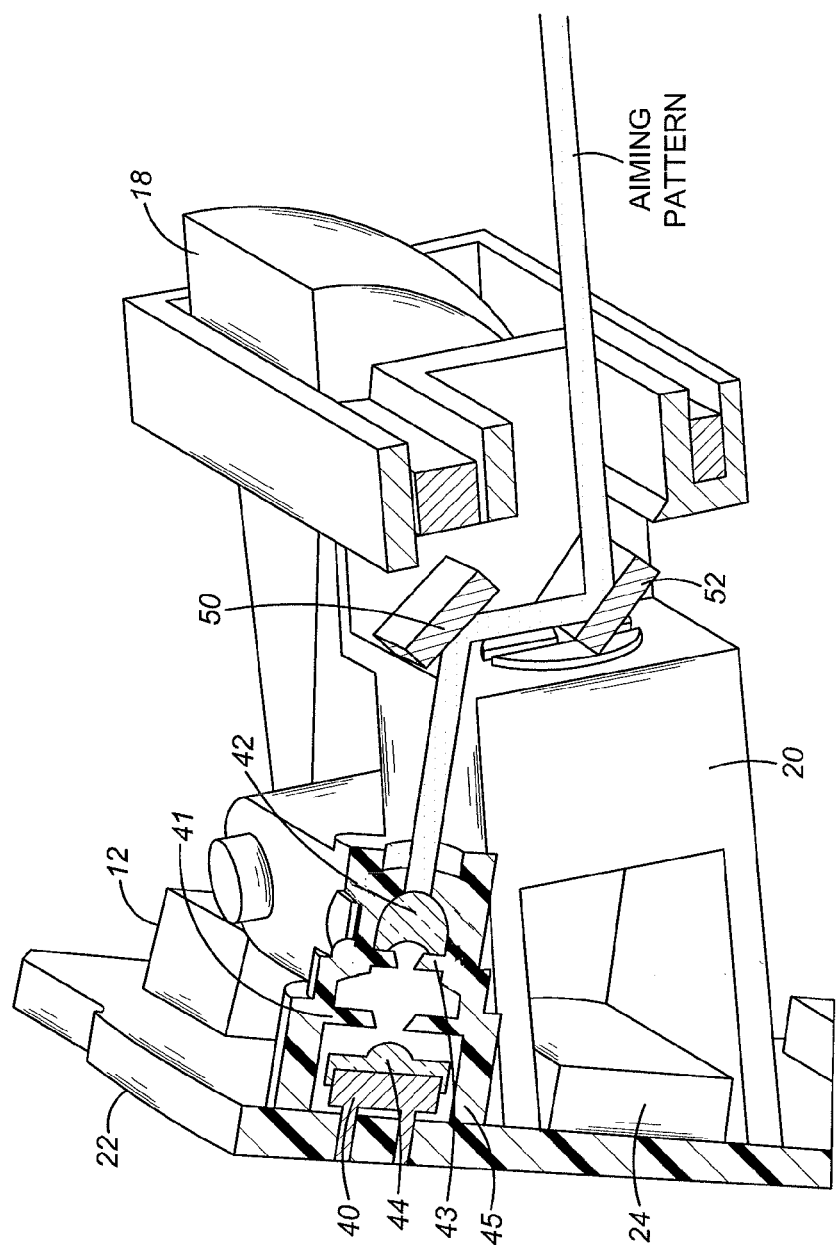
FIG. 5 is a partially broken-away, enlarged side view depicting operation of the aiming light assembly in accordance with this invention.

Turning now to FIGS. 3-5, the imaging assembly 20, 24 is preferably mounted at a lower elevation on the PCB 22, and the aiming light assembly is mounted at a higher elevation on the same PCB 22. The illumination LEDs 10, 12 are located at opposite sides of the imager 24 on the same PCB 22, and the aiming light assembly is above the imager 24. An upper fold mirror 50 is located at the higher elevation, and a lower fold mirror 52 is located at the lower elevation. The upper fold mirror 50 redirects the intercepted aiming light beam emitted by the aiming light assembly to the lower fold mirror 52. The lower fold mirror 52 reflects the aiming light beam incident thereon outwardly through the window 26 toward the symbol 38 at the same lower elevation as the imaging assembly 20, 24.

Figure 6:
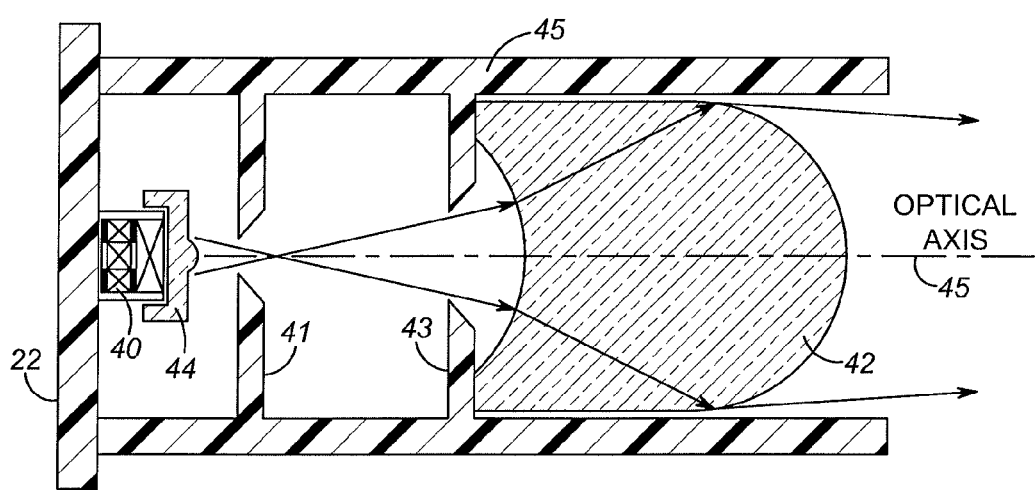
FIG. 6 is an enlarged side view depicting operation of the aiming light assembly of FIG. 5.

As best seen in FIGS. 5-6, the aiming LED 40 preferably has no lens dome, i.e., the LED chip is not covered by the lens dome that conventionally serves to reduce the divergence of the emitted aiming light beam. In accordance with this disclosure, the aiming lens 42 is advantageously configured as a concave-convex lens having a concave surface facing the field stop 41. A light baffle 43 preferably abuts against the aiming lens 42. The baffle 43 is located between the field stop 41 and the aiming lens 42 to eliminate reflections from the outer diameter of the aiming lens 42 for generating a clean sharp aiming light spot. In further accordance with this disclosure, the field lens 44 is advantageously configured as a plano-convex lens having a convex surface facing the field stop 41, and is located in the vicinity of the field stop 41 and is spaced away from the aiming LED 40. As described below, the field lens 44 is operative for imaging the LED 40 downstream of the field stop 41 and in the vicinity of a lens aperture of the aiming lens 42, and preferably onto the lens aperture. All the aforementioned components of the aiming light assembly are contained in a tubular holder 45 on the PCB 22 and are spaced along an optical axis 45 of the aiming lens 42.

Turning now to the ray diagrams of FIGS. 8A, 8B of the present invention, for contrast with the above-described ray diagrams of FIGS. 7A, 7B of the prior art, the addition of the field lens 44 between the LED 40 and the field stop 41 serves, among other things, to maximize brightness and uniformity of the aiming light spot, as described below. As in the prior art, the LED 40 illuminates the field stop 41, which is then imaged by the aiming lens 42 to a certain distance D2. The points B1' and B2' are images of the points B1 and B2 of the field stop 41. In a preferred embodiment, the field lens 44 images the LED 40 onto the lens aperture of the aiming lens 42. The points A1' and A2' are images of the points A1 and A2 of the LED 40.

Figure 7A:
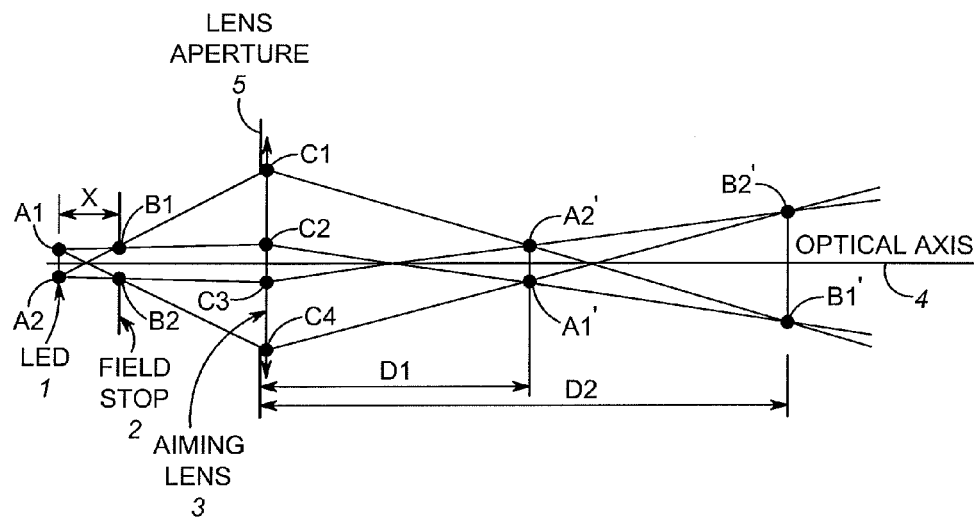
FIG. 7A is a ray diagram depicting operation of an aiming light assembly in accordance with the prior art in which the components are symmetrically arranged on an optical axis.
Figure 8A:
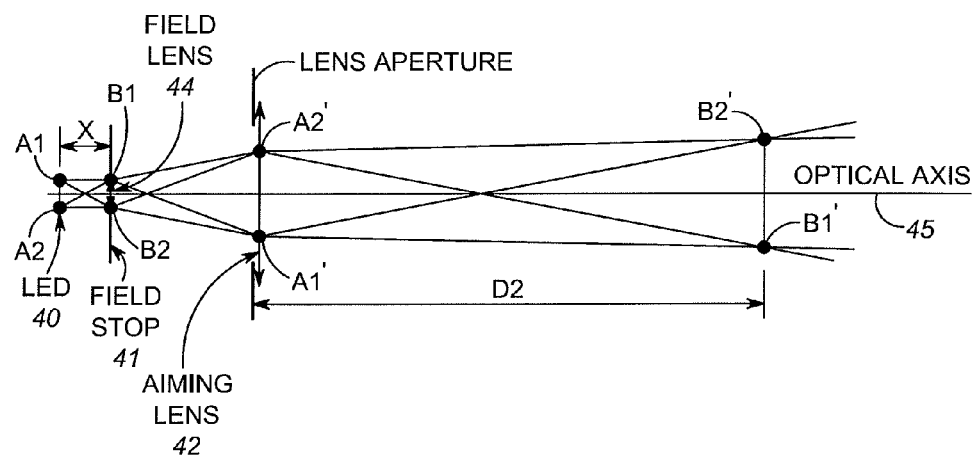
FIG. 8A is a ray diagram depicting operation of an aiming light assembly in accordance with the present invention in which the components are symmetrically arranged on an optical axis.

Thus, in FIG. 7A, the prior art aiming light spot (which contains the images of the points A1 and A2 of the LED 40) at the distance D1 includes visible optical artifacts caused by the presence of contacts, wires, etc. on the chip surface of the LED 40. Since the distance D1 is within the working distance range, the aiming light spot on any target in the vicinity of the distance D1 will contain these optical irregularities and, as noted above, compromises the aiming process. By contrast, in FIG. 8A, the field lens 44 has imaged the points A1 and A2 of the LED 40 on the aiming lens 42. Put another way, the distance D1 has been set to zero. Thus, there is no image of the LED chip, or any optical artifacts, present in any aiming light spot at any distance from the aiming lens 42.

Figure 7B:
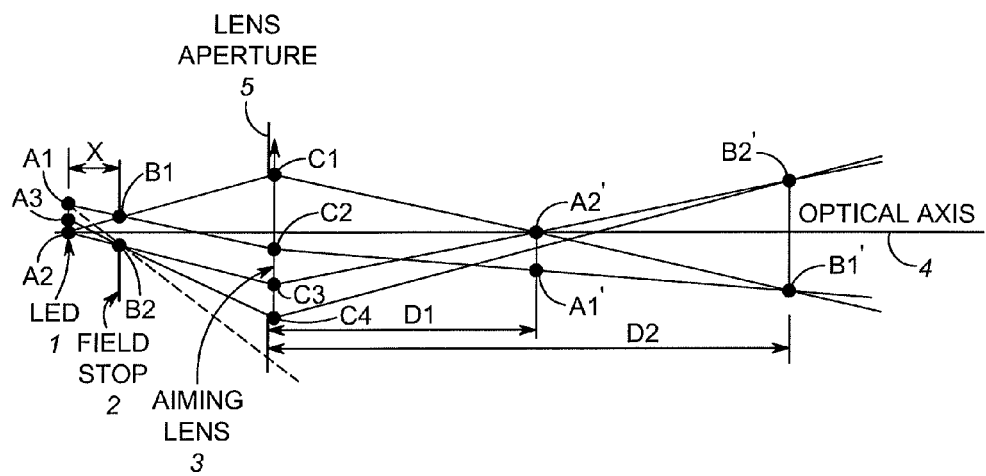
FIG. 7B is a ray diagram similar to FIG. 7A in which the prior art components are not symmetrically arranged relative to the optical axis.
Figure 8B:
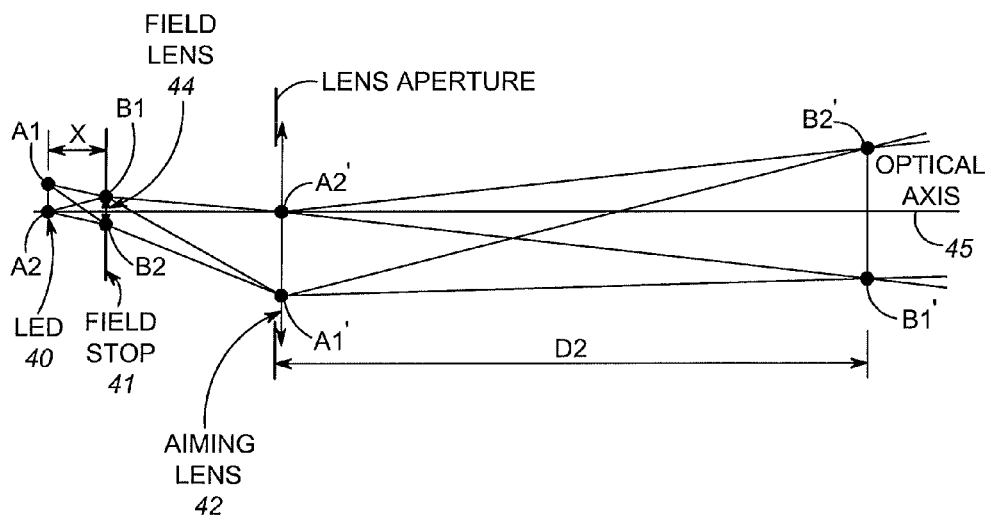
FIG. 8B is a ray diagram similar to FIG. 8A in which the components are not symmetrically arranged relative to the optical axis.

In FIG. 8B, the LED 40 is offset from the optical axis in a manner analogous to that shown in FIG. 7B. Yet, whereas, as described above, point B1' was much brighter than point B2' in the prior art, now, the presence of the field lens 44 causes the aiming light spot to be more uniform in brightness, since all points of the aiming light spot collect light energy from the same area between the points A1-A2 of the LED 40 through the same area between the points A1'-A2' on the aiming lens 42. The area between the points A1' and A2' in FIG. 8A is the same as the area between the points A1' and A2' in FIG. 8B and, as a result, the aiming lens 42 need not be enlarged, as in the prior art, to tolerate such offsets. The aiming light assembly of this invention may be maintained compact.

By way of non-limiting numerical example, in one embodiment, the LED 40 has an output power of 10 lumens and is driven at 70 mA; the pinhole opening of the field stop 41 is circular and measures about 0.4 mm in diameter; the aiming lens 42 has an effective focal length (EFL) of about 10 mm and its lens aperture measures about 4.6 mm×4.0 mm. The aiming lens 42 is installed at about 10.6 mm away from the pinhole opening of the field stop 41 along the optical axis 45.

Figure 9A:
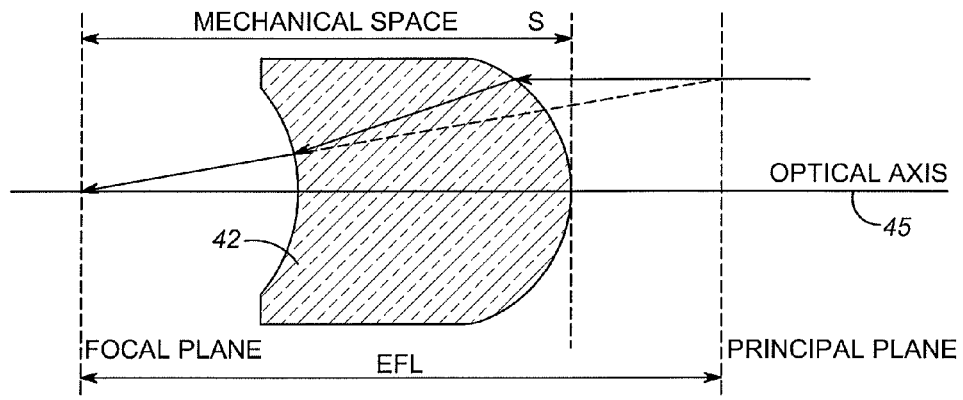
FIG. 9A is a diagram depicting the mechanical space available for the aiming lens in accordance with the present invention.
Figure 9B:
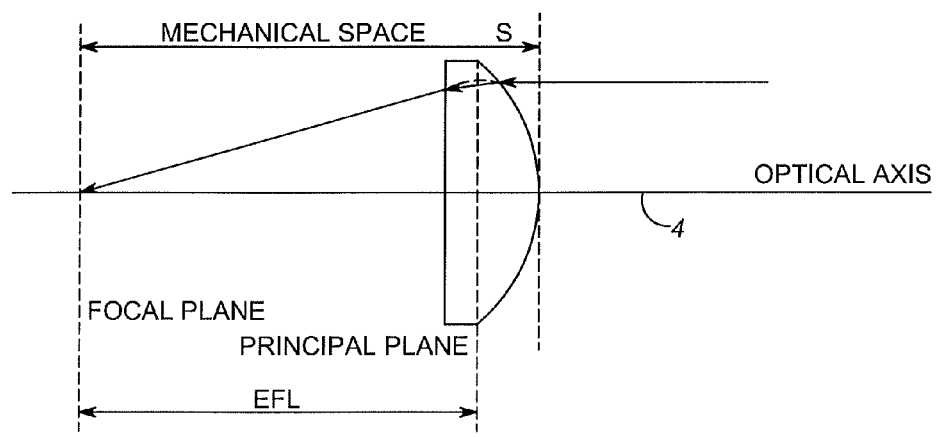
FIG. 9B is a diagram similar to FIG. 9A depicting the mechanical space available for the aiming lens in accordance with the prior art.

As shown in FIG. 9A, the aiming lens 42 is a thick plastic meniscus (concave-convex) component curved toward the field stop 41. This allows maximizing its effective focal length within the mechanical space limitations of the aiming light assembly. By way of non-limiting numerical example, if the available mechanical space S is about 9.7 mm, then the aiming lens 42 can have an EFL of about 11.4 mm. By contrast, in the prior art depicted in FIG. 9B, the aiming lens is a thin planar-convex lens and has an EFL of about 8.8 mm or less. The increased EFL of the aiming lens 42 of the instant invention decreases the aiming light spot size by about 1.3 times, and the aiming light spot brightness is increased by about 1.7 times. Preferably, both lens surfaces of the aiming lens 42 are aspheric to minimize off-axis aberrations and thus maximize sharpness of the aiming light spot.

It is a matter of practical trade-offs to optimize the axial distance between the LED 40 and the field lens 44. For example, if a particular application allows the LED 40 and its artifacts to be visible in the aiming light spot at close-in working distances, then some level of spot asymmetry may be tolerated, in which case, the LED 40 can be moved closer to the field lens 44, thus increasing output power in the aiming light spot. The final design optimization depends also on tolerances on the location of the optical components of the aiming light assembly.

The axial distance between the field lens 44 and the field stop 41 is preferably chosen to maximize the optical power getting through the pinhole opening of the field stop. By way of non-limiting numerical example, the optimum distance between the field lens 44 and the field stop 41 is about 0.3 mm when using a field lens 44 with an EFL of about 1.2 mm, and a lens aperture of about 0.4 mm.

In the foregoing specification, specific embodiments have been described. However, one of ordinary skill in the art appreciates that various modifications and changes can be made without departing from the scope of the invention as set forth in the claims below. For example, rather than generating a single aiming light spot centrally of the target, the aiming light assembly can generate two aiming light spots to bracket opposite ends of a one-dimensional target, or can generate four aiming light spots to bracket opposite corners of a two-dimensional target. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. In a reader for electro-optically reading targets to be read by image capture over a range of working distances, an aiming light assembly for generating at least one aiming light spot with increased brightness and uniformity over the range of working distances, the aiming light assembly comprising:
 a light emitting diode (LED) for emitting an aiming light beam;
 a field stop through which the aiming light beam passes, the field stop being in close confronting relationship with the LED;
 an aiming lens having a lens aperture and an optical axis, the aiming lens being spaced along the optical axis away from the field stop and being operative for optically modifying the aiming light beam passing through the field stop to form the at least one aiming light spot over the range of working distances; and
 a field lens located in the vicinity of the field stop and spaced along the optical axis away from the LED, and operative for imaging the LED downstream to the vicinity of the lens aperture of the aiming lens.

2. The aiming light assembly of claim 1, wherein the LED has a chip uncovered by a lens dome, and wherein the field stop includes a pinhole through which the aiming light beam from the chip passes.

3. The aiming light assembly of claim 1, wherein the field lens is located between the LED and the field stop along the optical axis.

4. The aiming light assembly of claim 1, wherein the field lens is operative for imaging the LED onto the lens aperture of the aiming lens.

5. The aiming light assembly of claim 4, wherein the LED is offset from the optical axis, and wherein the field lens is operative for imaging the entire LED onto the lens aperture of the aiming lens despite the offset.

6. The aiming light assembly of claim 1, wherein the field lens is a plano-convex lens having a convex surface facing the field stop.

7. The aiming light assembly of claim 1, wherein the aiming lens is a concave-convex lens having a concave surface facing the field stop.

8. The aiming light assembly of claim 1, and further comprising a printed circuit board (PCB) for supporting the aiming light assembly.

9. An imaging module in a reader for electro-optically reading targets by image capture over a range of working distances, the imaging module comprising:
 a printed circuit board (PCB);
 an illumination light assembly mounted on the PCB for illuminating a target;
 an imaging assembly having a solid-state imager with an array of image sensors mounted on the PCB, and an imaging lens for capturing return light over an imaging field of view (FOV) from the illuminated target, and for projecting the captured return light onto the array; and
 an aiming light assembly mounted on the PCB, for generating at least one aiming light spot with increased brightness and uniformity over the range of working distances on the target prior to illuminating and reading the target, the aiming light assembly including a light emitting diode (LED) for emitting an aiming light beam, a field stop through which the aiming light beam passes, the field stop being in close confronting relationship with the LED, an aiming lens having a lens aperture and an optical axis, the aiming lens being spaced along the optical axis away from the field stop and being operative for optically modifying the aiming light beam passing through the field stop to form the at least one aiming light spot over the range of working distances, and a field lens located in the vicinity of the field stop and spaced along the optical axis away from the LED, the field lens being operative for imaging the LED downstream to the vicinity of the lens aperture of the aiming lens.

10. The imaging module of claim 9, wherein the field lens is located between the LED and the field stop along the optical axis.

11. The imaging module of claim 9, wherein the field lens is operative for imaging the LED onto the lens aperture of the aiming lens.

12. The imaging module of claim 9, wherein the LED is offset from the optical axis, and wherein the field lens is operative for imaging the entire LED onto the lens aperture of the aiming lens despite the offset.

13. The imaging module of claim 9, wherein the field lens is a plano-convex lens having a convex surface facing the field stop, and wherein the aiming lens is a concave-convex lens having a concave surface facing the field stop.

14. A method of generating at least one aiming light spot with increased brightness and uniformity over a range of working distances in which targets are electro-optically read by image capture, the method comprising:
   emitting an aiming light beam from a light emitting diode (LED);
   passing the aiming light beam through a field stop that is in close confronting relationship with the LED;
   optically modifying the aiming light beam passing through the field stop to form the at least one aiming light spot over the range of working distances by spacing an aiming lens, which has a lens aperture and an optical axis, away from the field stop along the optical axis; and
   imaging the LED downstream to the vicinity of the lens aperture of the aiming lens by locating a field lens in the vicinity of the field stop and spaced away from the LED along the optical axis.

15. The method of claim 14, and uncovering a chip of the LED, and passing the aiming light beam from the chip through a pinhole of the field stop.

16. The method of claim 14, and positioning the field lens between the LED and the field stop along the optical axis.

17. The method of claim 14, wherein the imaging is performed by imaging the LED onto the lens aperture of the aiming lens.

18. The method of claim 17, wherein the LED is offset from the optical axis, and wherein the imaging is performed by imaging the entire LED onto the lens aperture of the aiming lens despite the offset.

19. The method of claim 14, and configuring the field lens as a plano-convex lens having a convex surface facing the field stop.

20. The method of claim 14, and configuring the aiming lens as a concave-convex lens having a concave surface facing the field stop.

* * * * *